US011951740B2

(12) United States Patent
Tamai et al.

(10) Patent No.: US 11,951,740 B2
(45) Date of Patent: Apr. 9, 2024

(54) LIQUID EJECTING HEAD AND LIQUID EJECTING APPARATUS

(71) Applicant: SEIKO EPSON CORPORATION, Tokyo (JP)

(72) Inventors: Shotaro Tamai, Matsumoto (JP); Takahiro Katakura, Okaya (JP); Takanori Aimono, Matsumoto (JP); Yuta Okawa, Matsumoto (JP); Hitoshi Takaai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 79 days.

(21) Appl. No.: 17/648,891

(22) Filed: Jan. 25, 2022

(65) Prior Publication Data

US 2022/0234354 A1 Jul. 28, 2022

(30) Foreign Application Priority Data

Jan. 28, 2021 (JP) ................................ 2021-011737

(51) Int. Cl.
*B41J 2/14* (2006.01)

(52) U.S. Cl.
CPC ....... *B41J 2/14233* (2013.01); *B41J 2/14274* (2013.01); *B41J 2002/14306* (2013.01); *B41J 2002/14338* (2013.01); *B41J 2202/11* (2013.01)

(58) Field of Classification Search
CPC ................ B41J 2/14233; B41J 2/14274; B41J 2002/14306; B41J 2002/14338; B41J 2202/11
See application file for complete search history.

(56) References Cited

U.S. PATENT DOCUMENTS 6,979,077 B2 * 12/2005 Sakaida ............... B41J 2/14209 347/68
2019/0329559 A1 10/2019 Ozawa

FOREIGN PATENT DOCUMENTS

JP 2018-103418 A 7/2018

* cited by examiner

*Primary Examiner* — Geoffrey S Mruk
(74) *Attorney, Agent, or Firm* — WORKMAN NYDEGGER

(57) ABSTRACT

A communication plate in which are provided a first communication channel communicating with the first pressure chamber and the second pressure chamber and a first common liquid chamber communicating with the first pressure chamber and the second pressure chamber at positions different from positions at which the first communication channel communicates with the first pressure chamber and the second pressure chamber, and a nozzle substrate in which a first nozzle communicating with the first pressure chamber and the second pressure chamber in common via the first communication channel is provided. A second communication channel communicating with the first common liquid chamber and communicating with the first pressure chamber and the second pressure chamber in common is provided in the pressure chamber substrate or the communication plate.

20 Claims, 11 Drawing Sheets

LIQUID EJECTING HEAD AND LIQUID EJECTING APPARATUS

The present application is based on, and claims priority from JP Application Serial Number 2021-011737, filed Jan. 28, 2021, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting head provided in a liquid ejecting apparatus, such as a piezoelectric ink jet printer, typically includes a nozzle, a pressure chamber that communicates with the nozzle, and a piezoelectric element that changes pressure in the pressure chamber.

As described in, for example, JP-A-2018-103418, an apparatus that enables liquid in a plurality of pressure chambers to be ejected from a single nozzle to address an increase in viscosity of ink, ejection of liquid having a large particle size, or the like is known.

In the apparatus described in JP-A-2018-103418, two pressure chambers provided side by side in a direction intersecting an array direction of nozzles communicate with a single nozzle. On the other hand, the configuration may be such that two pressure chambers provided side by side in the array direction of nozzles communicate with a single nozzle. Such a configuration has an advantage, for example, in that the number of common liquid chambers to supply liquid to the two pressure chambers is only one. When such a configuration is simply adopted, however, the pressure in the respective pressure chambers readily escapes to the common liquid chamber, and ejection characteristics thus need to be improved.

SUMMARY

To address the aforementioned problem, an aspect of a liquid ejecting head according to the disclosure includes a pressure chamber substrate in which a first pressure chamber and a second pressure chamber adjacent to the first pressure chamber in a first direction are provided, a communication plate in which are provided a first communication channel communicating with the first pressure chamber and the second pressure chamber and a first common liquid chamber communicating with the first pressure chamber and the second pressure chamber at positions different from positions at which the first communication channel communicates with the first pressure chamber and the second pressure chamber, and a nozzle substrate in which a first nozzle communicating with the first pressure chamber and the second pressure chamber in common via the first communication channel is provided. A second communication channel communicating with the first common liquid chamber and communicating with the first pressure chamber and the second pressure chamber in common is provided in the pressure chamber substrate or the communication plate.

An aspect of a liquid ejecting apparatus according to the disclosure includes the liquid ejecting head according to the aspect described above, and a control section that controls a liquid ejection operation by the liquid ejecting head.

DESCRIPTION OF EXEMPLARY EMBODIMENTS

Figure 1:
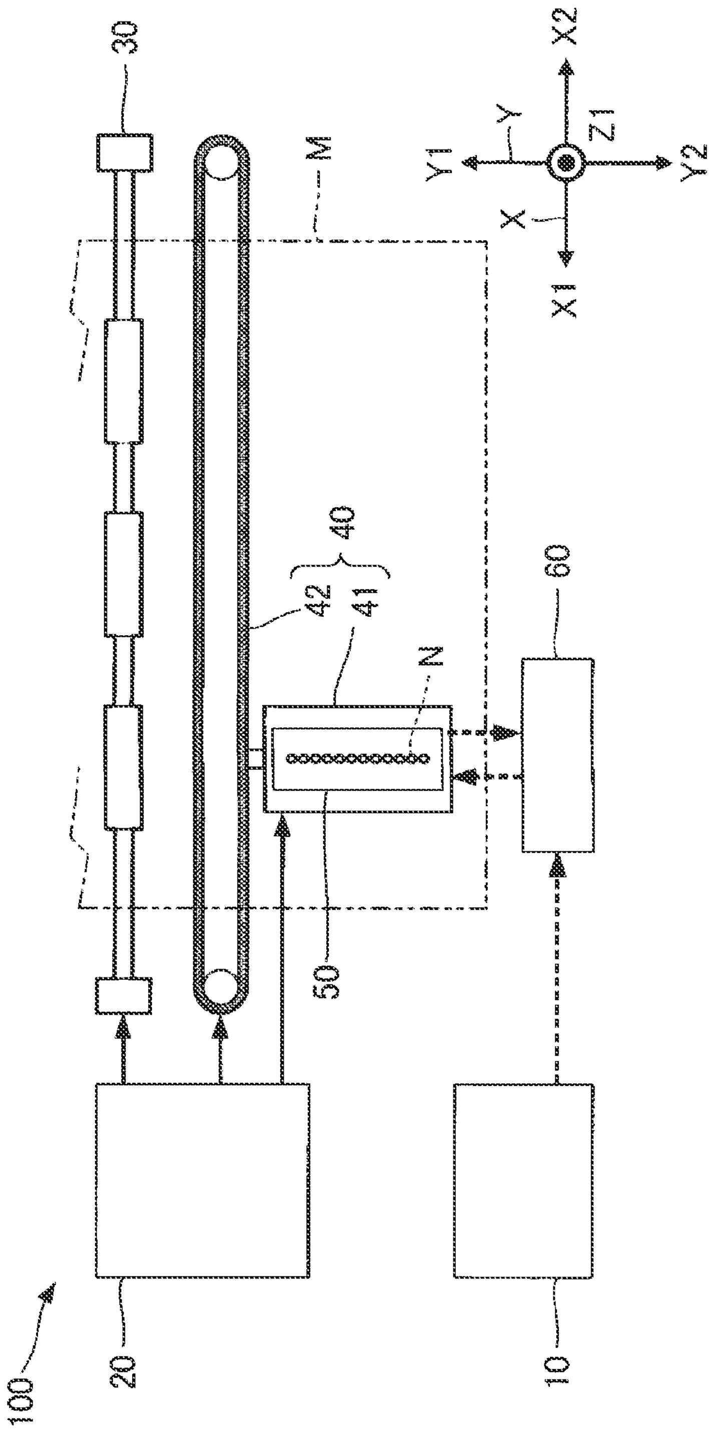
FIG. 1 is a diagram schematically illustrating a liquid ejecting apparatus according to a first embodiment.

Embodiments according to the disclosure will be described below with reference to the accompanying drawings. Note that, dimensions or scales of sections in the drawings differ from actual ones as appropriate, and some sections may be schematically illustrated for ease of understanding. The scope of the disclosure is not limited to the embodiments as long as there is no description particularly limiting the disclosure in the following description.

Note that, for convenience of description, the following description will be given by appropriately using the X-axis, the Y-axis, and the Z-axis, which cross each other. In the following description, a direction extending along the X-axis is an X1 direction, and a direction opposite to the X1 direction is an X2 direction. Similarly, directions opposite to each other along the Y-axis are a Y1 direction and a Y2 direction. Directions opposite to each other along the Z-axis are a Z1 direction and a Z2 direction. The Y1 direction or the Y2 direction is an example of a first direction. The X1 direction or the X2 direction is an example of a second direction. The Z1 direction or the Z2 direction is an example of a third direction. Viewing in the Z-axis direction is referred to as plan view in some cases.

Here, the Z-axis is typically an axis extending in the vertical direction, and the Z2 direction corresponds to the downward direction in the vertical direction. However, the Z-axis is not necessarily the axis extending in the vertical direction. Moreover, the X-axis, the Y-axis, and the Z-axis are typically orthogonal to each other but are not limited thereto; they may cross each other at an angle in a range of, for example, 80° to 100°.

1. First Embodiment

1-1. Overall Configuration of Liquid Ejecting Apparatus

FIG. 1 is a diagram schematically illustrating a liquid ejecting apparatus 100 according to a first embodiment. The liquid ejecting apparatus 100 is an ink jet printing apparatus that ejects ink, which is an example of a liquid, in the form of liquid droplets onto a medium M. The medium M is typically a printing sheet. Note that the medium M is not limited to a printing paper sheet and may be any printing object made from resin film, fabric, or the like.

As illustrated in FIG. 1, a liquid container 10 in which ink is stored is attached to the liquid ejecting apparatus 100. Examples of a specific aspect of the liquid container 10 include a cartridge detachably attached to the liquid ejecting apparatus 100, a bag-like ink pack formed from a flexible film, and an ink tank that is able to be replenished with ink. Note that any type of ink may be stored in the liquid container 10.

The liquid ejecting apparatus 100 includes a control unit 20, a transporting mechanism 30, a moving mechanism 40, a liquid ejecting head 50, and a circulating mechanism 60.

The control unit 20 includes, for example, a processing circuit such as a central processing unit (CPU) or a field programmable gate array (FPGA) and a storage circuit such as semiconductor memory and controls operation of the respective elements of the liquid ejecting apparatus 100. Here, the control unit 20 is an example of a control section and controls an ink ejection operation by the liquid ejecting head 50. One or more control units 20 may be provided.

The transporting mechanism 30 transports the medium M in the Y2 direction in accordance with control performed by the control unit 20. The moving mechanism 40 causes the liquid ejecting head 50 to reciprocate in the X1 direction and the X2 direction in accordance with control performed by the control unit 20. In the example illustrated in FIG. 1, the moving mechanism 40 includes a substantially box-shaped transporting body 41 referred to as a carriage in which the liquid ejecting head 50 is accommodated and a transporting belt 42 to which the transporting body 41 is fixed. Note that one or two or more liquid ejecting heads 50 are mounted on the transporting body 41. In addition to the liquid ejecting head 50, the liquid container 10 described above may be mounted on the transporting body 41.

The liquid ejecting head 50 ejects the ink, which is supplied from the liquid container 10 via the circulating mechanism 60, from a plurality of nozzles N onto the medium M in the Z2 direction in accordance with control performed by the control unit 20. When the ejection is performed in conjunction with transporting of the medium M by the transporting mechanism 30 and reciprocation of the liquid ejecting head 50 by the moving mechanism 40, an image by ink is formed on a surface of the medium M.

The circulating mechanism 60 is a mechanism that supplies the ink to the liquid ejecting head 50 and that collects the ink, which is discharged from the liquid ejecting head 50, to again supply the ink to the liquid ejecting head 50. According to such operation of the circulating mechanism 60, it is possible to suppress increase in viscosity of the ink and reduce air bubbles remaining in the ink. Note that the configuration of the circulating mechanism 60 will be described with reference to FIG. 2 described below.

1-2. Channel of Liquid Ejecting Apparatus

Figure 2:
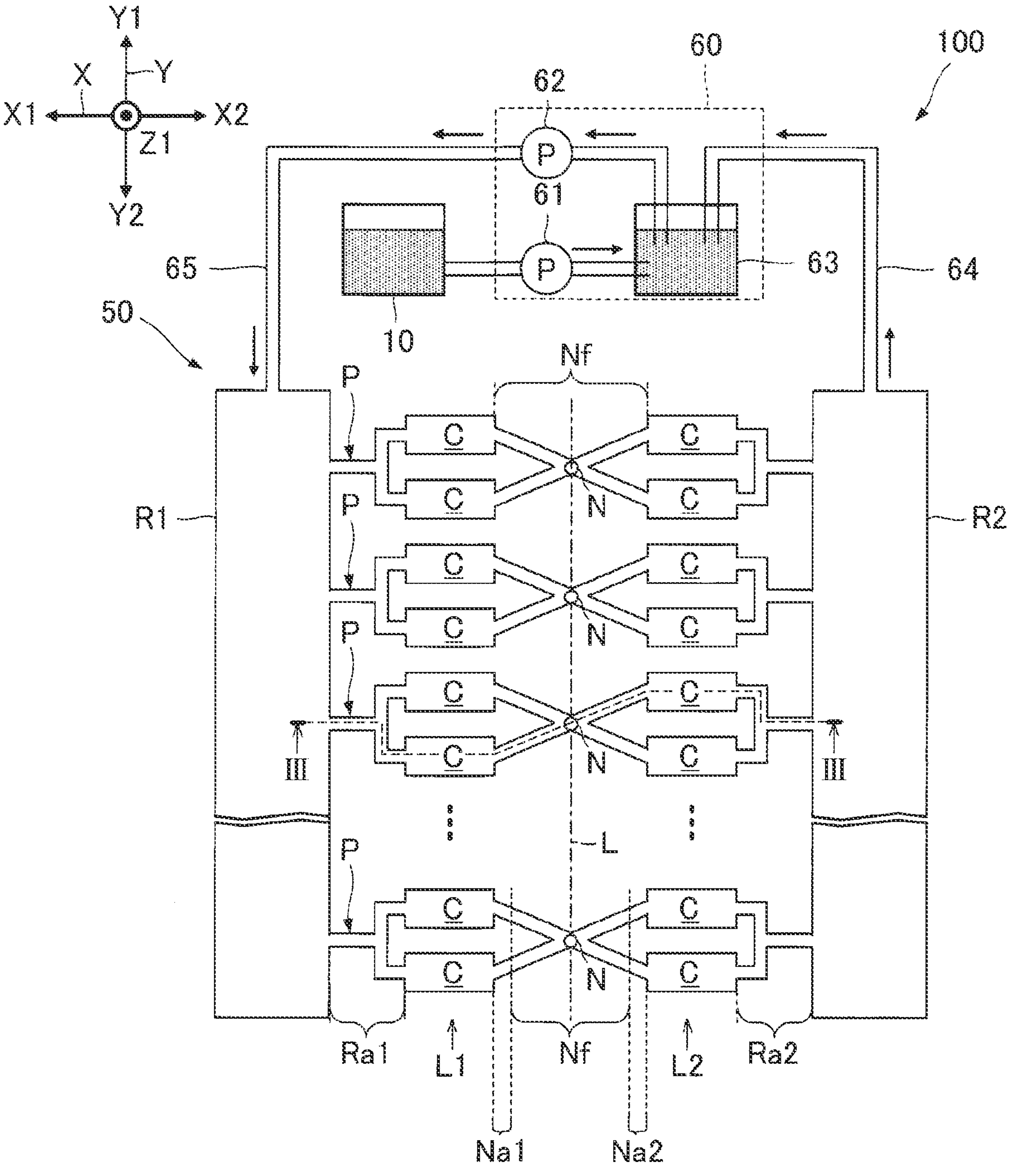
FIG. 2 is an illustration of a liquid channel in the liquid ejecting apparatus according to the first embodiment.

FIG. 2 is an illustration of a liquid channel in the liquid ejecting apparatus 100 according to the first embodiment. As illustrated in FIG. 2, the liquid ejecting head 50 includes a plurality of nozzles N, a plurality of individual channels P, a first common liquid chamber R1, and a second common liquid chamber R2 and is coupled to the circulating mechanism 60.

The plurality of nozzles N are arranged in the Y-axis direction, and a set of the plurality of nozzles N forms a nozzle row L. Each of the individual channels P communicates with a corresponding one of the plurality of nozzles N.

The plurality of individual channels P are provided for the respective nozzles N. Each of the individual channels P includes four pressure chambers C, a nozzle channel Nf, a communication channel Na1, which is an example of a first communication channel, a communication channel Na2, which is an example of a fourth communication channel, a communication channel Ra1, which is an example of a second communication channel, and a communication channel Ra2, which is an example of a third communication channel.

The plurality of pressure chambers C of the plurality of individual channels P are divided into pressure chambers C, which are arranged in the Y-axis direction and belong to a row L1, and pressure chambers C, which are arranged in the Y-axis direction at positions different from those in the row L1 in the X1 direction or the X2 direction and belong to a row L2.

Here, four pressure chambers C included in each of the individual channels P are two pressure chambers C adjacent to each other of the pressure chambers C belonging to the row L1 and two pressure chambers C adjacent to each other of the pressure chambers C belonging to the row L2.

Note that, of two pressure chambers C in each individual channel P which belong to the row L1, one pressure chamber C corresponds to a first pressure chamber C_1 described later, and the other pressure chamber C corresponds to a second pressure chamber C_2 described later. Of two pressure chambers C in each individual channel P which belong to the row L2, one pressure chamber C corresponds to a third pressure chamber C_3 described later, and the other pressure chamber C corresponds to a fourth pressure chamber C_4 described later.

Note that, of two pressure chambers C in each individual channel P which belong to the row L1, one pressure chamber C adjacent to a second pressure chamber of another individual channel P can also correspond to a fifth pressure chamber C_5 described later, and the other pressure chamber C can also correspond to a sixth pressure chamber C_6 described later. Of two pressure chambers C in each individual channel P which belong to the row L2, one pressure chamber C adjacent to a second pressure chamber of another individual channel P can also correspond to a seventh pressure chamber C_7 described later, and the other pressure chamber C can also correspond to an eighth pressure chamber C_8 described later.

Two pressure chambers C in the row L1 and two pressure chamber C in the row L2 in an individual channel P communicate with each other via the nozzle channel Nf, the communication channel Na1, and the communication channel Na2. The communication channel Na1 is interposed between the two pressure chambers C in the row L1 and the nozzle channel Nf. On the other hand, the communication channel Na2 is interposed between the two pressure chambers C in the row L2 and the nozzle channel Nf. Each of the nozzle channels Nf includes a nozzle N. In the nozzle channel Nf, the ink is ejected from the nozzle N when the pressure in the two pressure chambers C in the row L1 described above and the pressure in the two pressure chambers C in the row L2 described above change.

The individual channels P each communicate with the first common liquid chamber R1 and the second common liquid chamber R2. The first common liquid chamber R1 is coupled to an end in the X1 direction of each of the individual channels P and communicates with two pressure chambers C in the row L1 via the communication channel Ra1 in each of the individual channels P. The ink to be supplied to the individual channels P is stored in the first common liquid chamber R1. On the other hand, the second common liquid chamber R2 is coupled to an end in the X2 direction of each of the individual channels P and communicates with two pressure chambers C in the row L2 via the communication channel Ra2 in each of the individual channels P. The ink discharged from the individual channel P but not ejected is stored in the second common liquid chamber R2.

The circulating mechanism 60 is coupled to the first common liquid chamber R1 and the second common liquid chamber R2. The circulating mechanism 60 supplies the ink to the first common liquid chamber R1 and collects the ink, which is discharged from the second common liquid chamber R2, to supply the ink again to the first common liquid chamber R1. The circulating mechanism 60 includes a first supplying pump 61, a second supplying pump 62, a storage container 63, a collecting channel 64, and a supplying channel 65.

The first supplying pump 61 is a pump for supplying the ink, which is stored in the liquid container 10, to the storage container 63. The storage container 63 is a temporary-storage tank in which the ink supplied from the liquid container 10 is temporarily stored. The collecting channel 64 is a channel that is interposed between the second common liquid chamber R2 and the storage container 63 and that enables the ink in the second common liquid chamber R2 to be collected in the storage container 63. The ink stored in the liquid container 10 is supplied from the first supplying pump 61 to the storage container 63, and further, the ink discharged from the individual channels P to the second common liquid chamber R2 is supplied to the storage container 63 via the collecting channel 64. The second supplying pump 62 is a pump for feeding the ink stored in the storage container 63. The supplying channel 65 is a channel that is interposed between the first common liquid chamber R1 and the storage container 63 and that enables the ink in the storage container 63 to be supplied to the first common liquid chamber R1.

1-3. Overall Configuration of Liquid Ejecting Head

Figure 3:
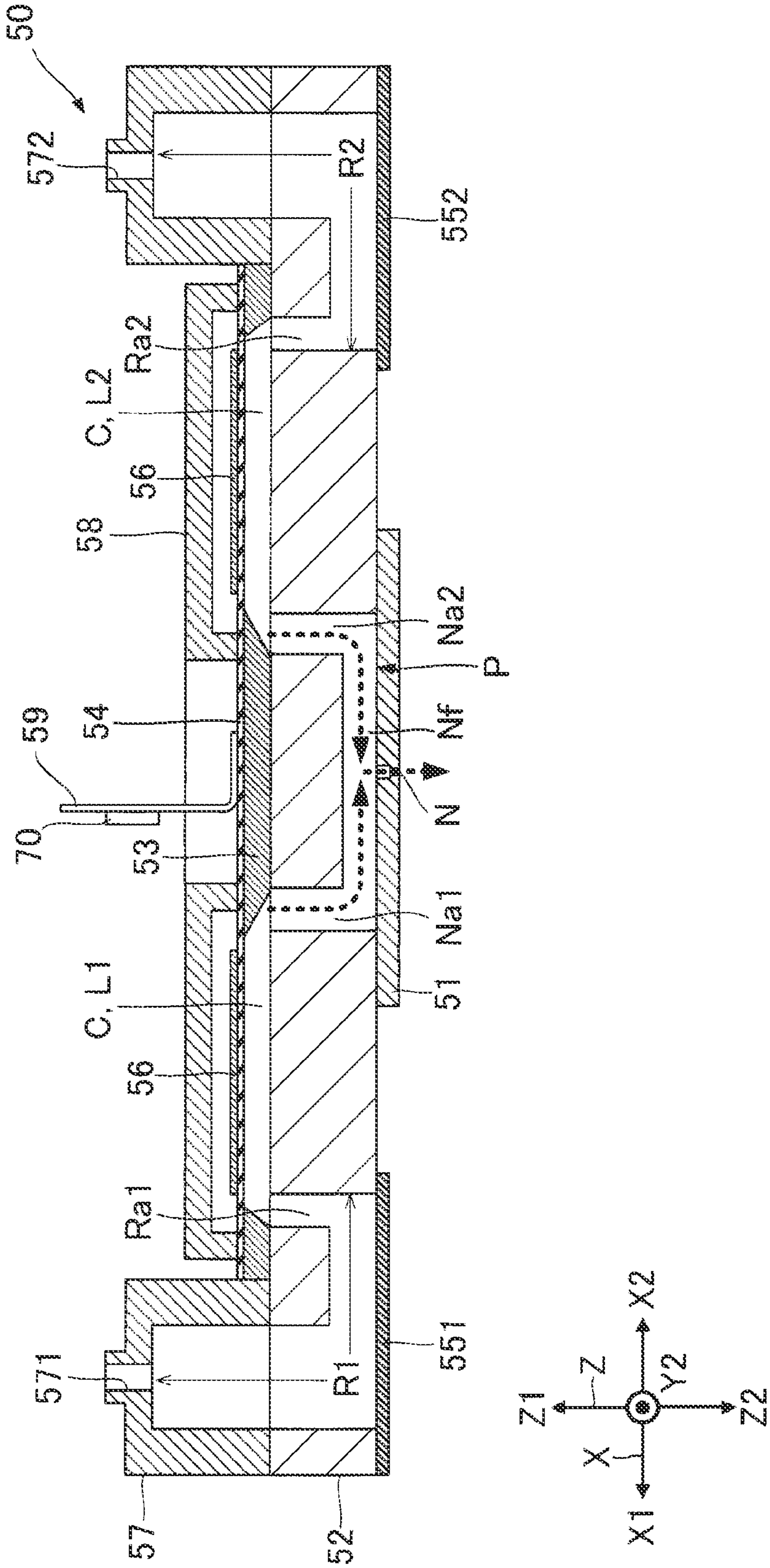
FIG. 3 is a sectional view of a liquid ejecting head according to the first embodiment.

FIG. 3 is a sectional view of the liquid ejecting head 50 according to the first embodiment. FIG. 3 is a sectional view along line III-III in FIG. 2. As illustrated in FIG. 3, the liquid ejecting head 50 includes a nozzle substrate 51, a communication plate 52, a pressure chamber substrate 53, a vibrating plate 54, vibration absorbers 551 and 552, a plurality of piezoelectric elements 56, a housing 57, a sealing body 58, a wiring substrate 59, and a drive circuit 70.

Here, the pressure chamber substrate 53, the vibrating plate 54, the plurality of piezoelectric elements 56, the housing 57, and the sealing body 58 are disposed in a region located in the Z1 direction relative to the communication plate 52. On the other hand, the nozzle substrate 51, the vibration absorber 551, and the vibration absorber 552 are disposed in a region located in the Z2 direction relative to the communication plate 52. Of the components of the liquid ejecting head 50 described above, the nozzle substrate 51, the communication plate 52, the pressure chamber substrate 53, and the vibrating plate 54 are stacked in this order in the Z1 direction. Such a stacked structure includes the first common liquid chamber R1, the second common liquid chamber R2, the plurality of individual channels P, and the plurality of nozzles N described above. Moreover, the respective components are each schematically a plate member elongated in the Y direction and are bonded to each other with, for example, an adhesive.

The plurality of nozzles N are provided in the nozzle substrate 51. The nozzles N are through holes passing through the nozzle substrate 51 and enable the ink to pass therethrough. The nozzle substrate 51 is manufactured, for example, in such a manner that a silicon monocrystalline substrate is processed by using a semiconductor processing technique. As the silicon monocrystalline substrate, for example, a (100) silicon monocrystalline substrate is suitably used.

A portion of the first common liquid chamber R1, a portion of the second common liquid chamber R2, and the plurality of individual channels P excluding portions corresponding to the pressure chambers C are provided in the communication plate 52. That is, of the elements constituting each of the individual channels P, the nozzle channel Nf, the communication channel Na1, the communication channel Na2, the communication channel Rat, and the communication channel Ra2 are provided in the communication plate 52.

The portion of the first common liquid chamber R1 and the portion of the second common liquid chamber R2 are spaces passing through the communication plate 52. The vibration absorber 551 and the vibration absorber 552 that close openings corresponding to the spaces are disposed on the surface of the communication plate 52, which faces the Z2 direction.

The vibration absorber 551 and the vibration absorber 552 are each a layered member formed of an elastic material. The vibration absorber 551 forms a portion of a wall surface of the first common liquid chamber R1 and absorbs a pressure change in the first common liquid chamber R1. Similarly, the vibration absorber 552 forms a portion of a wall surface of the second common liquid chamber R2 and absorbs a pressure change in the second common liquid chamber R2.

The nozzle channel Nf is a groove provided on the surface of the communication plate 52, which faces in the Z2 direction. Here, the nozzle substrate 51 forms a portion of a wall surface of the nozzle channel Nf. The communication channel Na1, the communication channel Na2, the communication channel Ra1, and the communication channel Ra2 are spaces passing through the communication plate 52 and are open in the Z1 direction and the Z2 direction. The communication plate 52 described above is manufactured, for example, in such a manner that a silicon monocrystalline substrate is processed by using a semiconductor processing technique. As the silicon monocrystalline substrate, for example, a (110) silicon monocrystalline substrate is suitably used. Note that the nozzle channel Nf, the communication channel Na1, the communication channel Na2, the communication channel Ra1, and the communication channel Ra2 will be described in detail with reference to FIGS. 4 and 5 described later.

The pressure chambers C of the plurality of individual channels P are provided in the pressure chamber substrate 53. The respective pressure chambers C pass through the pressure chamber substrate 53 and are voids between the communication plate 52 and the vibrating plate 54. The pressure chamber substrate 53 is manufactured, for example, in such a manner that a silicon monocrystalline substrate is processed by using a semiconductor processing technique. As the silicon monocrystalline substrate, for example, a (110) silicon monocrystalline substrate is suitably used.

The vibrating plate 54 is a plate member capable of elastically vibrating. The vibrating plate 54 has a layered structure including, for example, a first layer made of silicon oxide ($SiO_2$) and a second layer made of zirconium oxide ($ZrO_2$). Here, another layer made of metal oxide or the like may be interposed between the first layer and the second layer. Note that a portion or the entirety of the vibrating plate 54 may be formed of the same material as the pressure chamber substrate 53 so as to be integrated with the pressure chamber substrate 53. For example, the vibrating plate 54 and the pressure chamber substrate 53 are able to be formed integrally by a plate member of a given thickness, from which a region corresponding to the pressure chamber C in the thickness direction is selectively removed. Moreover, the vibrating plate 54 may be formed by a single material layer.

The plurality of piezoelectric elements 56 corresponding to the pressure chambers C are disposed on the surface of the vibrating plate 54, which faces in the Z1 direction. Each of the piezoelectric elements 56 is constituted, for example, by stacking a first electrode and a second electrode that face each other with a piezoelectric layer formed between both the electrodes. The piezoelectric element 56 changes the pressure of the ink in the pressure chamber C to thereby eject the ink in the pressure chamber C from the nozzle N. Upon receiving a drive signal from the drive circuit 70, the piezoelectric element 56 causes the piezoelectric element 56 to deform and thereby causes the vibrating plate 54 to vibrate. In accordance with the vibration, the pressure chamber C expands or contracts, and the pressure of the ink in the pressure chamber C changes. Note that the piezoelectric element 56 may be provided in common to two pressure chambers C in the row L1 or the row L2 in each of the individual channels P.

The housing 57 is a casing in which the ink is stored. The housing 57 has a space demarcated by the first common liquid chamber R1 excluding the portion provided in the communication plate 52 and by the second common liquid chamber R2 excluding the portion provided in the communication plate 52. A hole 571 and a hole 572 are provided in the housing 57. The hole 571 is a pipe, which communicates with the first common liquid chamber R1, and is coupled to the supplying channel 65 of the circulating mechanism 60. Thus, the ink fed from the second supplying pump 62 to the supplying channel 65 is supplied to the first common liquid chamber R1 via the hole 571. On the other hand, the hole 572 is a pipe, which communicates with the second common liquid chamber R2, and is coupled to the collecting channel 64 of the circulating mechanism 60. Thus, the ink in the second common liquid chamber R2 is discharged to the collecting channel 64 via the hole 572.

The sealing body 58 is a structure that protects the plurality of piezoelectric elements 56 and that reinforces the mechanical strength of the pressure chamber substrate 53 and the vibrating plate 54. The sealing body 58 is bonded to the surface of the vibrating plate 54 with, for example, an adhesive. The sealing body 58 has a recess in which each of the plurality of piezoelectric elements 56 is housed.

The wiring substrate 59 is bonded to the surface of the vibrating plate 54, which faces in the Z1 direction. The wiring substrate 59 is a mounting component in which a plurality of wires for electrically coupling the control unit 20 and the liquid ejecting head 50 are formed. The wiring substrate 59 is a flexible wiring substrate, such as a flexible printed circuit (FPC) or flexible flat cable (FFC). The drive circuit 70 for driving the piezoelectric elements 56 is mounted on the wiring substrate 59. The drive circuit 70 supplies a drive signal to each of the piezoelectric elements 56.

In the liquid ejecting head 50 configured as described above, in accordance with the operation of the circulating mechanism 60 described above, the ink flows through the first common liquid chamber R1, the communication channel Ra1, the pressure chamber C in the row L1, the communication channel Na1, the nozzle channel Nf, the communication channel Na2, the pressure chamber C in the row L2, the communication channel Ra2, and the second common liquid chamber R2 in this order. Note that the circulating mechanism 60 operates in any period or at any timing, and whether the circulating mechanism 60 operates in a period or at a timing overlapping a period or timing in or at which the ink is ejected from the nozzle N is optional.

When piezoelectric elements 56 corresponding to the two pressure chambers C in the row L1 and to the two pressure chambers C in the row L2 in each of the individual channels P are driven at the same time, the pressure in the pressure chambers C changes, and the ink is ejected from the nozzle N in accordance with the change in pressure. In FIG. 3, the path and direction of a flow of the ink at this time are indicated by broken lines and arrows.

1-4. Channel of Liquid Ejecting Head

Figure 4:
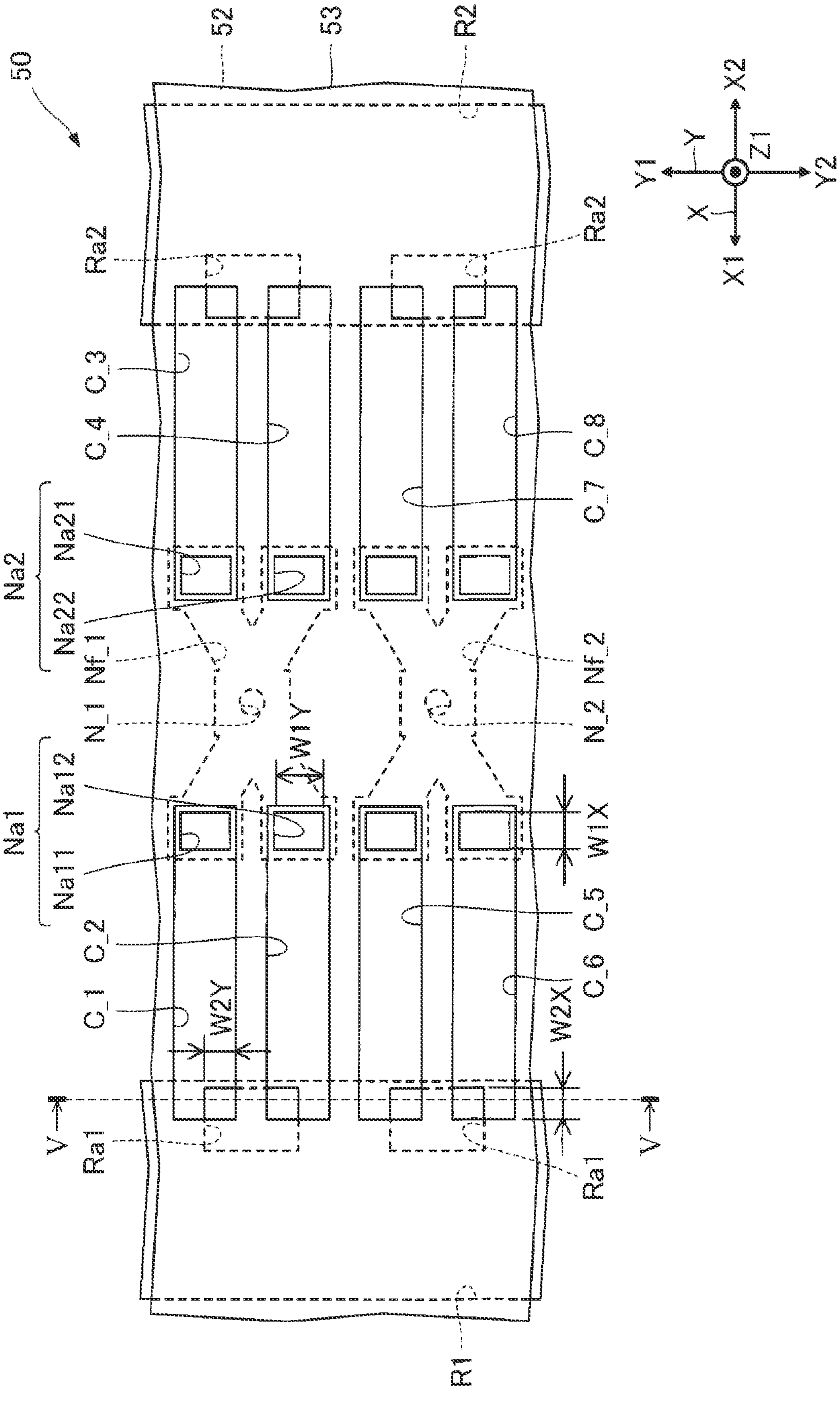
FIG. 4 is a plan view schematically illustrating a channel of the liquid ejecting head illustrated in FIG. 3.
Figure 5:
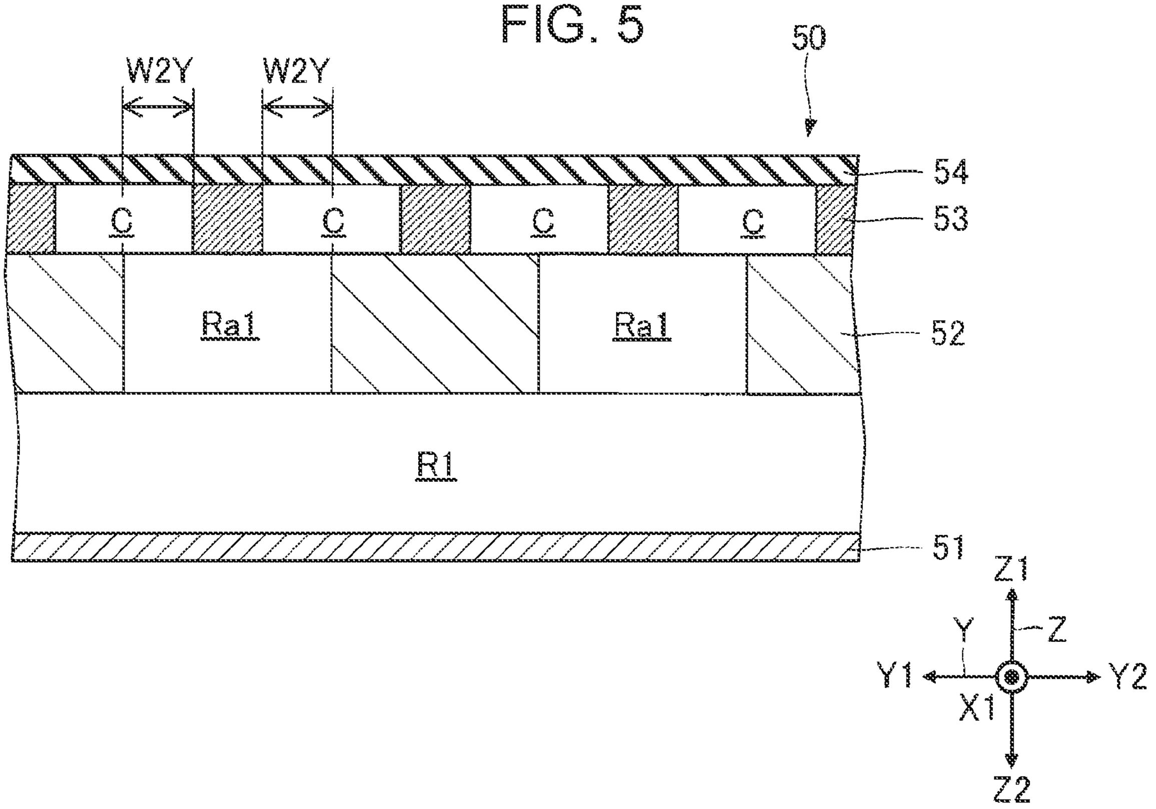
FIG. 5 is a sectional view along line V-V in FIG. 4.

FIG. 4 is a plan view schematically illustrating the channel of the liquid ejecting head 50 illustrated in FIG. 3. FIG. 5 is a sectional view along line V-V in FIG. 4. FIG. 4 illustrates how the pressure chamber C, the nozzle channel Nf, the communication channel Na1, the communication channel Na2, the communication channel Ra1, the communication channel Ra2, the first common liquid chamber R1, and the second common liquid chamber R2 are arranged when the pressure chamber substrate 53 is viewed in the Z2 direction. Note that FIG. 4 schematically illustrates shapes of the respective sections of the channel for convenience of description. However, for example, when the channel is formed in such a manner that a silicon monocrystalline substrate is processed by anisotropic etching, a wall surface extending along a crystal plane of the silicon monocrystalline substrate is actually provided in the channel appropriately.

FIG. 4 illustrates a first nozzle N_1 and a second nozzle N_2 as two nozzles N adjacent to each other in the Y1 direction or the Y2 direction. In addition, FIG. 4 illustrates a first nozzle channel Nf_1 as a nozzle channel Nf corresponding to the first nozzle N_1 and illustrates the first pressure chamber C_1, the second pressure chamber C_2, the third pressure chamber C_3, and the fourth pressure chamber C_4 as four pressure chambers C corresponding to the first nozzle N_1. FIG. 4 illustrates a second nozzle channel Nf_2 as a nozzle channel Nf corresponding to the second nozzle N_2 and illustrates the fifth pressure chamber C_5, the sixth pressure chamber C_6, the seventh pressure chamber C_7, and the eighth pressure chamber C_8 as four pressure chambers C corresponding to the second nozzle N_2.

As illustrated in FIG. 4, the first pressure chamber C_1, the second pressure chamber C_2, the fifth pressure chamber C_5, and the sixth pressure chamber C_6 are arranged in this order in the Y2 direction. Here, the first pressure chamber C_1 and the second pressure chamber C_2 are adjacent to each other in the Y1 direction or the Y2 direction. The second pressure chamber C_2 and the fifth pressure chamber C_5 are adjacent to each other in the Y1 direction or the Y2 direction. The fifth pressure chamber C_5 and the sixth pressure chamber C_6 are adjacent to each other in the Y1 direction or the Y2 direction.

Similarly, the third pressure chamber C_3, the fourth pressure chamber C_4, the seventh pressure chamber C_7, and the eighth pressure chamber C_8 are arranged in this order in the Y2 direction. Note that the third pressure chamber C_3 is located in the X2 direction with respect to the first pressure chamber C_1, and the first pressure chamber C_1 and the third pressure chamber C_3 are provided side by side in the X1 direction or the X2 direction. Similarly, the second pressure chamber C_2 and the fourth pressure chamber C_4 are provided side by side in the X1 direction or the X2 direction. The fifth pressure chamber C_5 and the seventh pressure chamber C_7 are provided side by side in the X1 direction or the X2 direction. The sixth pressure chamber C_6 and the eighth pressure chamber C_8 are provided side by side in the X1 direction or the X2 direction.

The communication channel Na1 includes a first portion Na11 and a second portion Na12. The respective portions are constituted by holes individually passing through the communication plate 52. In this manner, the communication channel Na1 is constituted by two channels per nozzle N.

Here, in the communication channel Na1 corresponding to the first nozzle N_1, the first portion Na11 is interposed between the first pressure chamber C_1 and the first nozzle channel Nf_1, and the second portion Na12 is interposed between the second pressure chamber C_2 and the first nozzle channel Nf_1. Similarly, in the communication channel Na1 corresponding to the second nozzle N_2, the first portion Na11 is interposed between the fifth pressure chamber C_5 and the second nozzle channel Nf_2, and the second portion Na12 is interposed between the sixth pressure chamber C_6 and the second nozzle channel Nf_2.

On the other hand, the communication channel Na2 includes a first portion Na21 and a second portion Na22. The respective portions are constituted by holes individually passing through the communication plate 52. In this manner, the communication channel Na2 is constituted by two holes passing through the communication plate 52 per nozzle N.

Here, in the communication channel Na2 corresponding to the first nozzle N_1, the first portion Na21 is interposed between the third pressure chamber C_3 and the first nozzle channel Nf_1, and the second portion Na22 is interposed between the fourth pressure chamber C_4 and the first nozzle channel Nf_1. Similarly, in the communication channel Na2 corresponding to the second nozzle N_2, the first portion Na21 is interposed between the seventh pressure chamber C_7 and the second nozzle channel Nf_2, and the second portion Na22 is interposed between the eighth pressure chamber C_8 and the second nozzle channel Nf_2.

On the other hand, differently from the communication channel Na1 and the communication channel Na2, the communication channel Ra1 and the communication channel Ra2 are each constituted by a single hole passing through the communication plate 52 per nozzle N.

Here, the communication channel Ra1 corresponding to the first nozzle N_1 is provided in common to the first pressure chamber C_1 and the second pressure chamber C_2 and interposed between the first and second pressure chambers C_1 and C_2 and the first common liquid chamber R1. Thus, the communication channel Ra1 corresponding to the first nozzle N_1 is open toward the first pressure chamber C_1 and the second pressure chamber C_2 and toward the first common liquid chamber R1.

Similarly, the communication channel Ra1 corresponding to the second nozzle N_2 is provided in common to the fifth pressure chamber C_5 and the sixth pressure chamber C_6 and interposed between the fifth and sixth pressure chambers C_5 and C_6 and the first common liquid chamber R1. Thus, the communication channel Ra1 corresponding to the second nozzle N_2 is open toward the fifth pressure chamber C_5 and the sixth pressure chamber C_6 and toward the first common liquid chamber R1.

To transfer the pressure from the pressure chamber C in the row L1 to the nozzle N efficiently, the communication channel Ra1 described above is configured such that the pressure is less likely to escape compared with the communication channel Na1. Specifically, for example, the channel resistance of the communication channel Ra1 is higher than the channel resistance of the communication channel Na1. Accordingly, a relation of $A<B+C$ is desirably satisfied, where A is a sum of sectional areas of openings of the communication channel Ra1 opening toward the first pressure chamber C_1 and the second pressure chamber C_2, B is a sectional area of an opening of the first portion Na11 opening toward the first pressure chamber C_1, and C is a sectional area of an opening of the second portion Na12 opening toward the second pressure chamber C_2. Note that, in the example illustrated in FIG. 4, A is represented by $W2X \times W2Y \times 2$, and B and C are each represented by $W1X \times W1Y$.

Note that not only a comparison between the openings of the communication channel Ra1 and the openings of the communication channel Na1 but also a comparison between the entire region of the communication channel Ra1 extending in the Z direction and the entire region of the communication channel Na1 extending in the Z direction are desirably considered for efficiency of the pressure from the pressure chamber C. Here, typically, when a channel is longer or has a smaller sectional area, the channel resistance thereof increases. On the other hand, both the communication channel Ra1 and the communication channel Na1 are provided so as to pass through the communication plate 52, and it is thus difficult for the communication channel Ra1 and the communication channel Na1 to differ largely from each other in the lengths thereof. Accordingly, a relation of $D<E+F$ is more desirably satisfied, where D is an average sectional area of the communication channel Ra1, E is an average sectional area of the first portion Na11 of the communication channel Na1, and F is an average sectional area of the second portion Na12 of the communication channel Na1.

On the other hand, the communication channel Ra2 corresponding to the first nozzle N_1 is provided in common to the third pressure chamber C_3 and the fourth pressure chamber C_4 and interposed between the third and fourth pressure chambers C_3 and C_4 and the second common liquid chamber R2. Thus, the communication channel Ra2 corresponding to the first nozzle N_1 is open toward the third pressure chamber C_3 and the fourth pressure chamber C_4 and toward the second common liquid chamber R2.

Similarly, the communication channel Ra2 corresponding to the second nozzle N_2 is provided in common to the seventh pressure chamber C_7 and the eighth pressure chamber C_8 and interposed between the seventh and eighth pressure chambers C_7 and C_8 and the second common liquid chamber R2. Thus, the communication channel Ra2 corresponding to the second nozzle N_2 is open toward the seventh pressure chamber C_7 and the eighth pressure chamber C_8 and toward the second common liquid chamber R2.

To transfer the pressure from the pressure chamber C in the row L2 to the nozzle N efficiently, similarly to the communication channel Ra1 described above, the communication channel Ra2 described above is configured such that the pressure is less likely to escape compared with the communication channel Na2.

As described above, the liquid ejecting head 50 includes the pressure chamber substrate 53, the communication plate 52, and the nozzle substrate 51. As described above, the first pressure chamber C_1 and the second pressure chamber C_2 adjacent to the first pressure chamber C_1 in the Y2 direction, which is an example of the first direction, are provided in the pressure chamber substrate 53. The communication channel Na1, which is an example of the first communication channel, communicating with the first pressure chamber C_1 and the second pressure chamber C_2 and the first common liquid chamber R1 communicating with the first pressure chamber C_1 and the second pressure chamber C_2 at positions different from positions at which the communication channel Na1 communicates with the first pressure chamber C_1 and the second pressure chamber C_2 are provided in the communication plate 52. The first nozzle N_1 communicating with the first pressure chamber C_1 and the second pressure chamber C_2 in common via the communication channel Na1 is provided in the nozzle substrate 51.

Additionally, the communication channel Ra1, which is an example of the second communication channel, communicating with the first common liquid chamber R1 and communicating with the first pressure chamber C_1 and the second pressure chamber C_2 in common is provided in the communication plate 52.

According to the liquid ejecting head 50 described above, since the first pressure chamber C_1 and the second pressure chamber C_2 communicate with the first common liquid chamber R1 via the common communication channel Ra1, the channel resistance of the communication channel Ra1 readily increases than the channel resistance of the communication channel Na1 compared with a configuration in which the first pressure chamber C_1 and the second pressure chamber C_2 each communicate with the first common liquid chamber R1 via an individual communication channel. Accordingly, it is possible to reduce a degradation in ejection characteristics due to the pressure in each of the first pressure chamber C_1 and the second pressure chamber C_2 escaping to the first common liquid chamber R1. That is, the pressure in each of the first pressure chamber C_1 and the second pressure chamber C_2 is able to be used efficiently for ejection of the ink from the first nozzle N_1, resulting in improvement of ejection characteristics compared with the related art.

On the other hand, in the configuration in which the first pressure chamber C_1 and the second pressure chamber C_2 each communicate with the first common liquid chamber R1 via an individual communication channel, a communication plate needs to be formed by highly accurate processing to increase the channel resistance of the individual communication channel. In particular, since pitches of nozzles have become narrower recently, the individual communication channel is further miniaturized, and it is thus difficult to form the individual communication channel.

In the present embodiment, as described above, the communication channel Ra1 is not provided in the pressure chamber substrate 53 but is provided in the communication plate 52. Thus, the configuration of the pressure chamber substrate 53 is able to be simplified compared with a configuration in which at least a portion of the communication channel Ra1 is provided in the pressure chamber substrate 53. As a result, it is possible to enhance flexibility in designing the pressure chamber substrate 53.

As described above, the first pressure chamber C_1 and the second pressure chamber C_2 each extend in the X1 direction or the X2 direction, which is an example of the second direction intersecting the first direction. The communication channel Na1 extends in the Z1 direction or the Z2 direction, which is an example of the third direction intersecting the first direction and the second direction. Thus, it is possible to transfer the pressure from each of the first pressure chamber C_1 and the second pressure chamber C_2 to the first nozzle N_1 via the communication channel Na1 efficiently compared with a configuration in which the communication channel Na1 extends in the same plane as the first pressure chamber C_1 and the second pressure chamber C_2.

Further, as described above, the communication channel Na1 includes the first portion Na11 and the second portion Na12. The first portion Na11 is interposed between the first pressure chamber C_1 and the first nozzle N_1. The second portion Na12 is interposed between the second pressure chamber C_2 and the first nozzle N_1 at a position away from the first portion Na11. Such a communication channel Na1 enables the pressure in each of the first pressure chamber C_1 and the second pressure chamber C_2 to be transferred to the first nozzle N_1 via the communication channel Na1 efficiently compared with a single channel common to the first pressure chamber C_1 and the second pressure chamber C_2.

As described above, the first nozzle channel Nf_1 having a portion interposed between the first portion Na11 and the first nozzle N_1 and a portion interposed between the second portion Na12 and the first nozzle N_1 is further provided in the communication plate 52. Thus, it is possible to increase a sectional area of the first nozzle channel Nf_1 while achieving a reduction in size of the liquid ejecting head 50 compared with a configuration in which the first nozzle channel Nf_1 is provided only in the nozzle substrate 51.

Further, as described above, the first nozzle channel Nf_1 extends in a direction intersecting the Y2 direction. Thus, the first nozzle channel Nf_1 is able to be provided along the nozzle substrate 51.

As described above, the relation of A<B+C is desirably satisfied, where A is a sum of sectional areas of the openings of the communication channel Ra1 opening toward the first pressure chamber C_1 and the second pressure chamber C_2, B is a sectional area of the opening of the first portion Na11 opening toward the first pressure chamber C_1, and C is a sectional area of the opening of the second portion Na12 opening toward the second pressure chamber C_2. When the relation is satisfied, even when the communication channel Ra1 and the communication channel Na1 are equal to each other in the lengths thereof, the channel resistance of the communication channel Ra1 is able to be made to be higher than the channel resistance of the communication channel Na1. Note that the relation of D<E+F is more desirably satisfied.

Here, when relations of A>B and A>C are satisfied, high processing accuracy is not required to form the communication channel Ra1 compared with an instance in which relations of A<B and A<C are satisfied, and the communication channel Ra1 is thus easily formed. Note that relations of D>E and D>F are more desirably satisfied to easily form the communication channel Ra1.

On the other hand, when the relations of A<B and A<C are satisfied, it is possible to increase the channel resistance of the communication channel Ra1 compared with an instance in which the relations of A>B and A>C are satisfied. Note that relations of D<E and D<F are more desirably satisfied to increase the channel resistance of the communication channel Ra1.

As described above, the fifth pressure chamber C_5 adjacent to the second pressure chamber C_2 in the Y2 direction is further provided in the pressure chamber substrate 53. The second nozzle N_2 adjacent to the first nozzle N_1 in the Y2 direction and communicating with the fifth pressure chamber C_5 is further provided in the nozzle substrate 51. Thus, the ink in the fifth pressure chamber C_5 is able to be ejected from the second nozzle N_2 independently from the ink ejected from the first nozzle N_1.

Here, the sixth pressure chamber C_6 adjacent to the fifth pressure chamber C_5 in the Y2 direction is further provided in the pressure chamber substrate 53. The second nozzle N_2 communicates with the fifth pressure chamber C_5 and the sixth pressure chamber C_6 in common. Thus, it is possible to eject the ink from the second nozzle N_2 efficiently by using the pressure in each of the fifth pressure chamber C_5 and the sixth pressure chamber C_6.

As described above, the third pressure chamber C_3 and the fourth pressure chamber C_4 are further provided in the pressure chamber substrate 53. The third pressure chamber C_3 is disposed at a position different from that of the first pressure chamber C_1 in the X1 direction or the X2 direction. The fourth pressure chamber C_4 is disposed at a position different from that of the second pressure chamber C_2 in the X1 direction or the X2 direction and is adjacent to the third pressure chamber C_3 in the Y2 direction. Additionally, the second common liquid chamber R2 disposed at a position different from that of the first common liquid chamber R1 in the X1 direction or the X2 direction and communicating with the third pressure chamber C_3 and the fourth pressure chamber C_4 is further provided in the communication plate 52. The first nozzle N_1 communicates with not only the first pressure chamber C_1 and the second pressure chamber C_2 but also the third pressure chamber C_3 and the fourth pressure chamber C_4 in common. Thus, it is possible to eject the ink from the first nozzle N_1 efficiently by using not only the pressure in each of the first pressure chamber C_1 and the second pressure chamber C_2 but also the pressure in each of the third pressure chamber C_3 and the fourth pressure chamber C_4.

Here, as described above, the communication channel Ra2, which is an example of the third communication channel, communicating with the second common liquid chamber R2 and communicating with the third pressure chamber C_3 and the fourth pressure chamber C_4 in common is further provided in the communication plate 52. Thus, the channel resistance of the communication channel Ra2 readily increases compared with a configuration in which the third pressure chamber C_3 and the fourth pressure chamber C_4 each communicate with the second common liquid chamber R2 via an individual communication channel. As a result, it is possible to reduce a degradation in ejection characteristics due to the pressure in each of the third pressure chamber C_3 and the fourth pressure chamber C_4 escaping to the second common liquid chamber R2.

In the present embodiment, as described above, the first common liquid chamber R1 is a liquid chamber in which the ink to be supplied to the first pressure chamber C_1 and the second pressure chamber C_2 is stored. Thus, the first common liquid chamber R1 includes the hole 571 as a supplying port for supplying liquid. On the other hand, the second common liquid chamber R2 is a liquid chamber in which the ink to be supplied to the third pressure chamber C_3 and the fourth pressure chamber C_4 is stored. Thus, the second common liquid chamber R2 includes the hole 572 as a supplying port for supplying the ink. As described above, the circulating mechanism 60 is coupled to the hole 571 and the hole 572 described above. Accordingly, it is possible to suppress viscosity of the ink in the liquid ejecting head 50 from increasing and suppress air bubbles from remaining in the ink channel of the liquid ejecting head 50.

2. Second Embodiment

A second embodiment of the disclosure will be described below. In an example of the embodiment below, elements having similar operations and functions to those of the first embodiment will be given the reference numerals used in the description for the first embodiment, and the detailed description thereof will be omitted appropriately.

Figure 6:
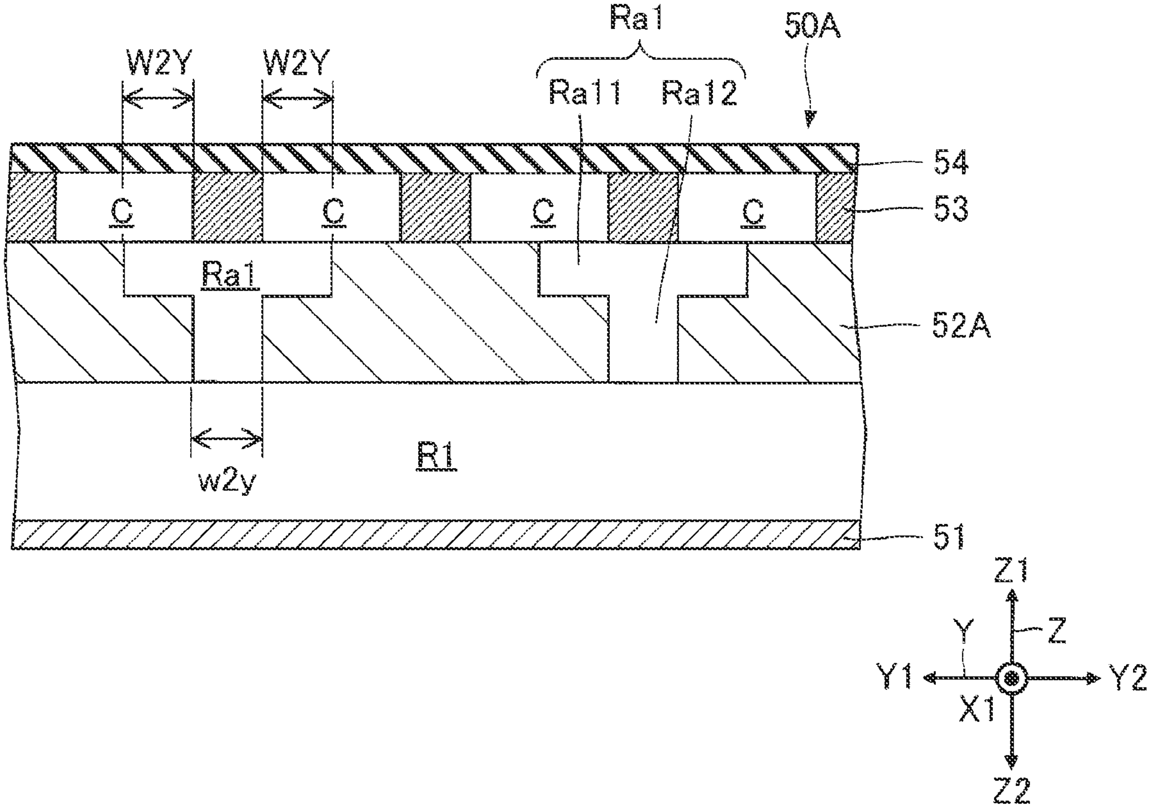
FIG. 6 is a sectional view of a liquid ejecting head according to a second embodiment.

FIG. 6 is a sectional view of a liquid ejecting head 50A according to the second embodiment. The liquid ejecting head 50A is similar to the liquid ejecting head 50 of the first embodiment described above except that a shape of the communication channel Ra1 is different. Note that, although not illustrated, the communication channel Ra2 has a configuration similar to that of the communication channel Ra1.

In the present embodiment, as illustrated in FIG. 6, the communication channel Ra1 has a shape that decreases in width in a stepwise manner in the Z2 direction when viewed in a cross section perpendicular to the X-axis direction. That is, the communication channel Ra1 includes a portion Ra11 communicating with the first pressure chamber C_1 and the second pressure chamber C_2 and a portion Ra12 interposed between the portion Ra11 and the first common liquid chamber R1. The portion Ra12 has a width in the Y-axis direction smaller than a width of the portion Ra11 in the Y-axis direction. In FIG. 6, the width of the portion Ra12 in the Y-axis direction is represented by w2*y*.

Note that the shape of the communication channel Ra1 is not limited to the example illustrated in FIG. 6, the communication channel Ra1 may have three or more portions that differ from each other in width in the Y-axis direction, and the width of the communication channel Ra1 in the Y-axis direction may be continuously reduced in the Z2 direction.

Similarly to the first embodiment described above, the second embodiment is also able to achieve improvement of ejection characteristics compared with the related art. In the present embodiment, since the width of the communication channel Ra1 in the Y-axis direction is reduced toward the first common liquid chamber R1, there is an advantage in that the channel resistance of the communication channel Ra1 readily increases compared with a configuration in which the width is not reduced.

3. Third Embodiment

A third embodiment of the disclosure will be described below. In an example of the embodiment below, elements having similar operations and functions to those of the first embodiment will be given the reference numerals used in the description for the first embodiment, and the detailed description thereof will be omitted appropriately.

Figure 7:
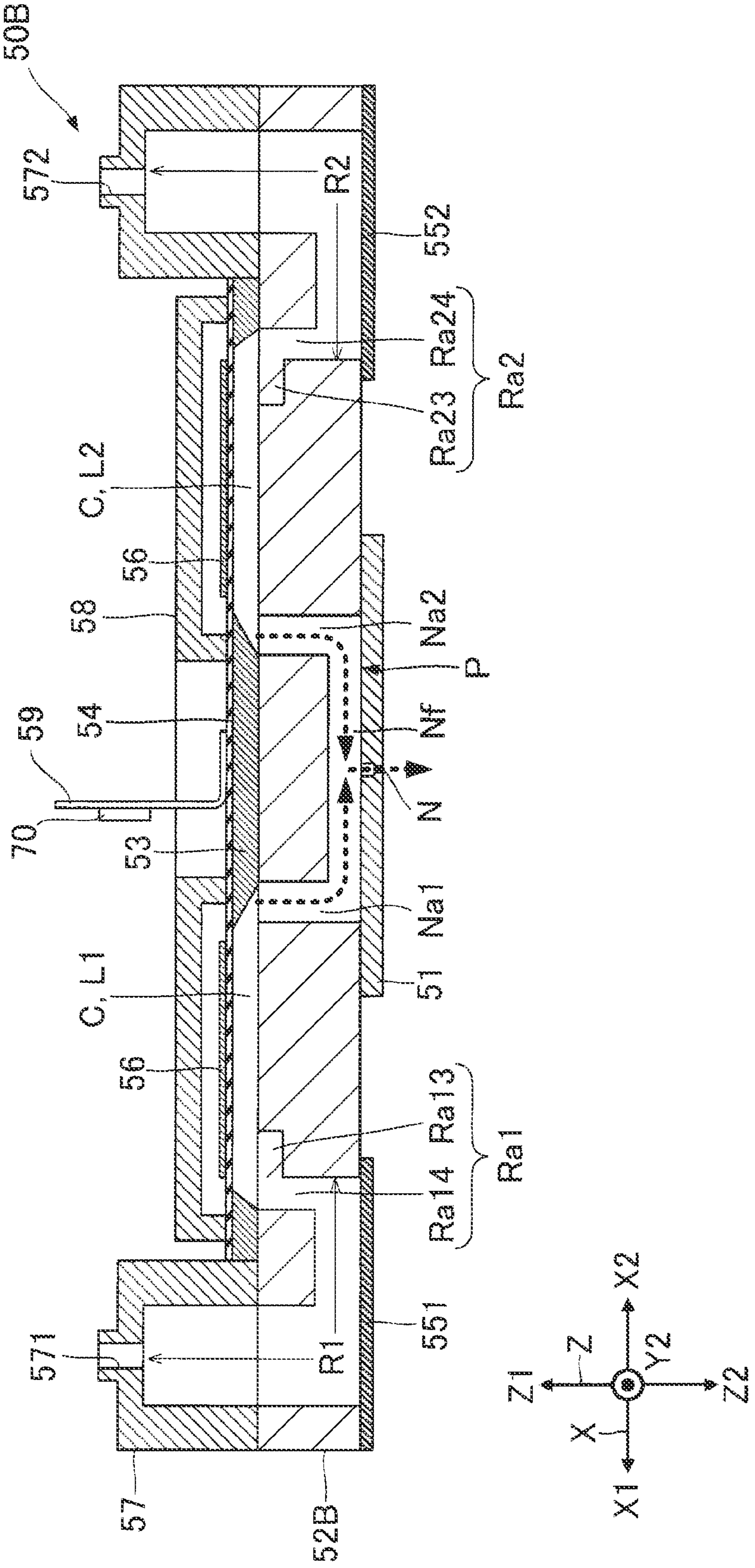
FIG. 7 is a sectional view of a liquid ejecting head according to a third embodiment.
Figure 8:
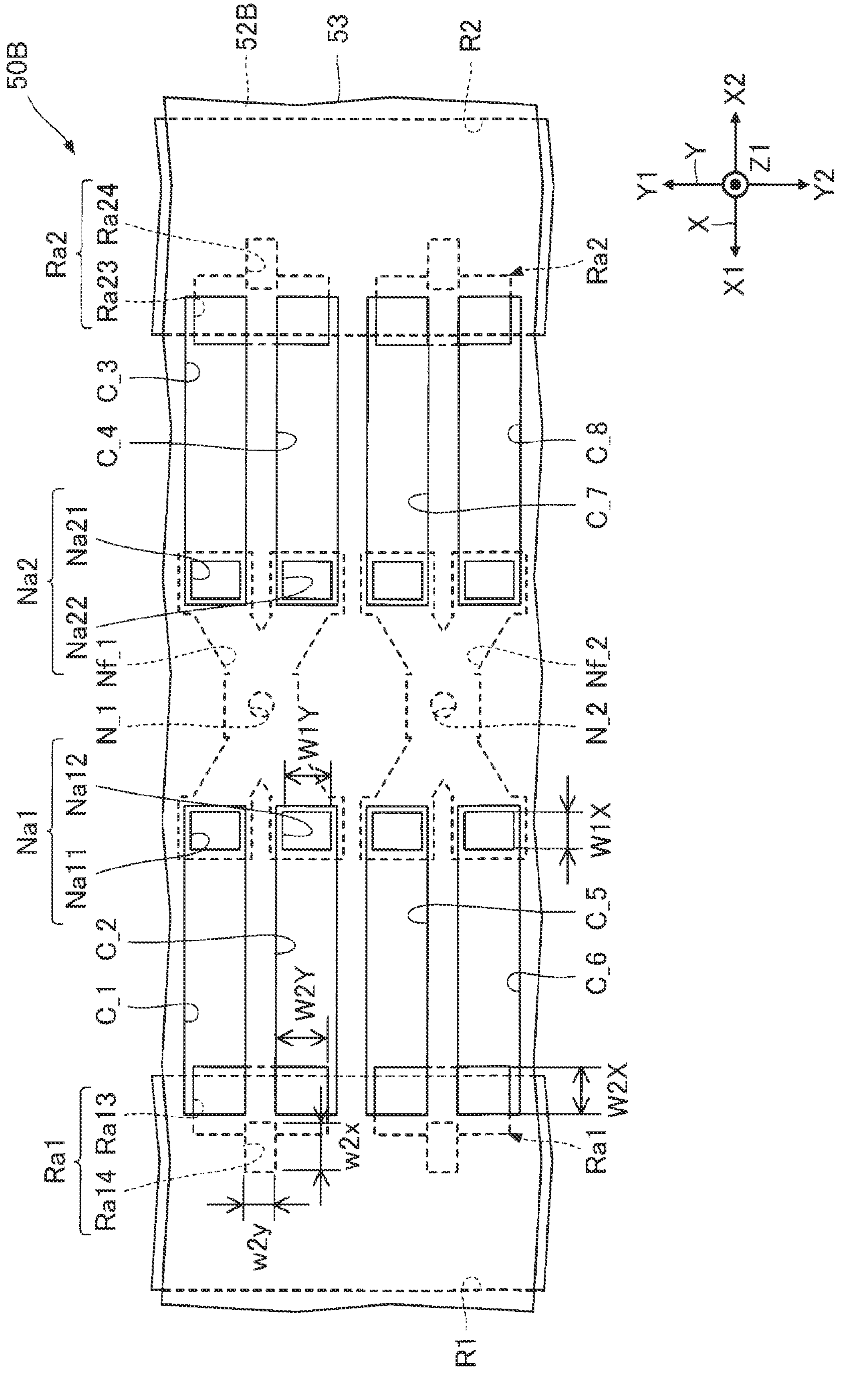
FIG. 8 is a plan view schematically illustrating a channel of the liquid ejecting head illustrated in FIG. 7.

FIG. 7 is a sectional view of a liquid ejecting head 50B according to the third embodiment. FIG. 8 is a plan view schematically illustrating a channel of the liquid ejecting head 50B illustrated in FIG. 7. The liquid ejecting head 50B is similar to the liquid ejecting head 50 of the first embodiment described above except that a communication plate 52B is provided instead of the communication plate 52. The communication plate 52B is similar to the communication plate 52 except that a shape of the communication channel Ra1 is different.

As illustrated in FIG. 7, the communication channel Ra1 of the present embodiment includes a portion Ra13 extending in the X-axis direction and a portion Ra14 extending in the Z-axis direction when viewed in a cross section perpendicular to the Y-axis direction. Here, the portion Ra14 is interposed between the portion Ra13 and the first common liquid chamber R1. Similarly, the communication channel Ra2 of the present embodiment includes a portion Ra23 extending in the X-axis direction and a portion Ra24 extending in the Z-axis direction when viewed in a cross section perpendicular to the Y-axis direction. Here, the portion Ra24 is interposed between the portion Ra23 and the second common liquid chamber R2.

As illustrated in FIG. 8, in the communication channel Ra1 of the present embodiment, the portion Ra13 communicates with the first pressure chamber C_1 and the second pressure chamber C_2, and the width of the portion Ra14 in the Y-axis direction is smaller than the width of the portion Ra13 in the Y-axis direction. Thus, the portion Ra13 enables the communication channel Ra1 to communicate with the first pressure chamber C_1 and the second pressure chamber C_2, and the portion Ra14 enables the channel resistance of the communication channel Ra1 to be higher. Note that, in FIG. 8, the width of the portion Ra14 in the Y-axis direction is represented by w2*y*, and the width of the portion Ra14 in the X-axis direction is represented by w2*x*.

Similarly, in the communication channel Ra2 of the present embodiment, the portion Ra23 communicates with the third pressure chamber C_3 and the fourth pressure chamber C_4, and the width of the portion Ra24 in the Y-axis direction is smaller than the width of the portion Ra23 in the Y-axis direction. Thus, the portion Ra23 enables the communication channel Ra2 to communicate with the third pressure chamber C_3 and the fourth pressure chamber C_4, and the portion Ra24 enables the channel resistance of the communication channel Ra2 to be higher.

Similarly to the first embodiment described above, the third embodiment is also able to achieve improvement of ejection characteristics compared with the related art.

4. Fourth Embodiment

A fourth embodiment of the disclosure will be described below. In an example of the embodiment below, elements having similar operations and functions to those of the first embodiment will be given the reference numerals used in the description for the first embodiment, and the detailed description thereof will be omitted appropriately.

Figure 9:
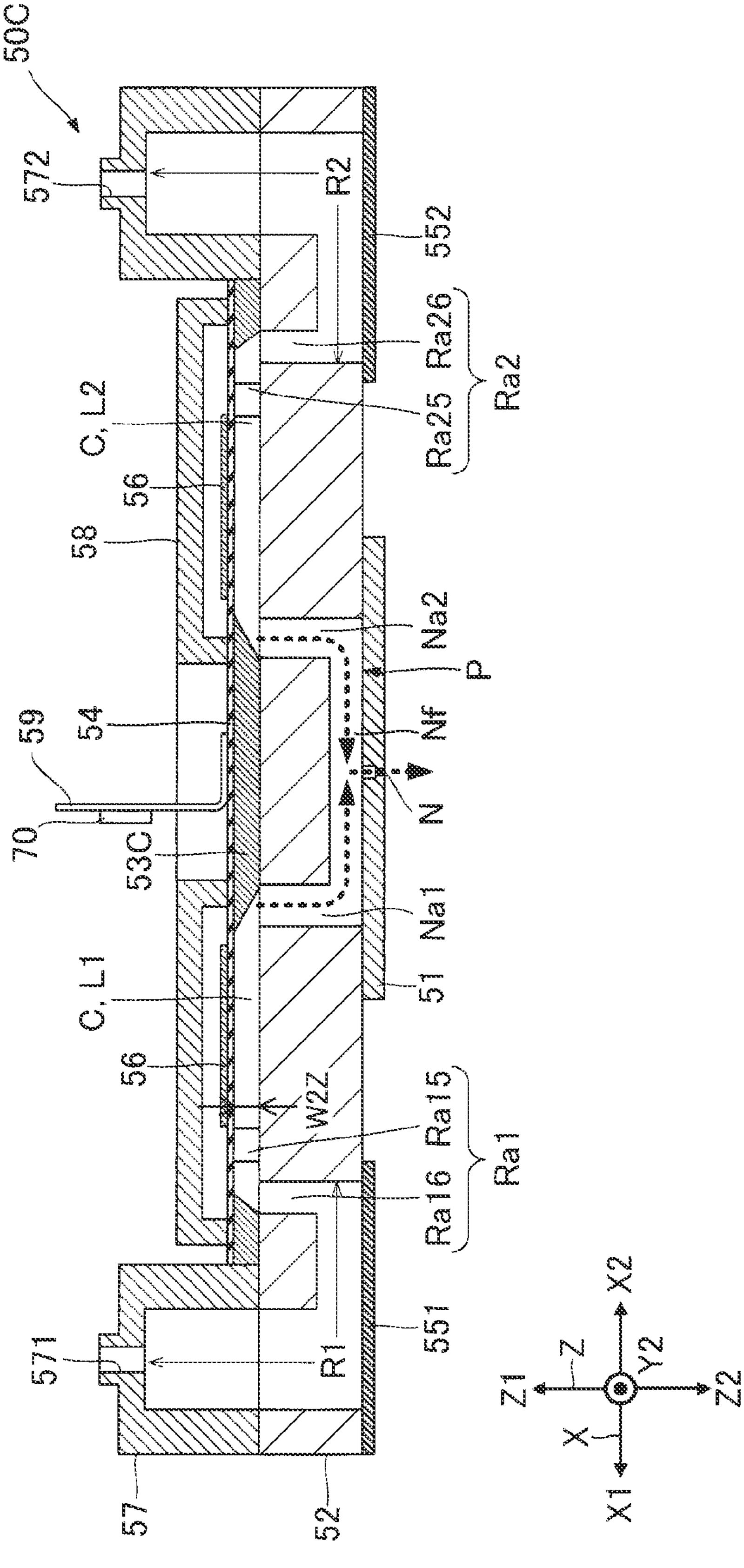
FIG. 9 is a sectional view of a liquid ejecting head according to a fourth embodiment.
Figure 10:
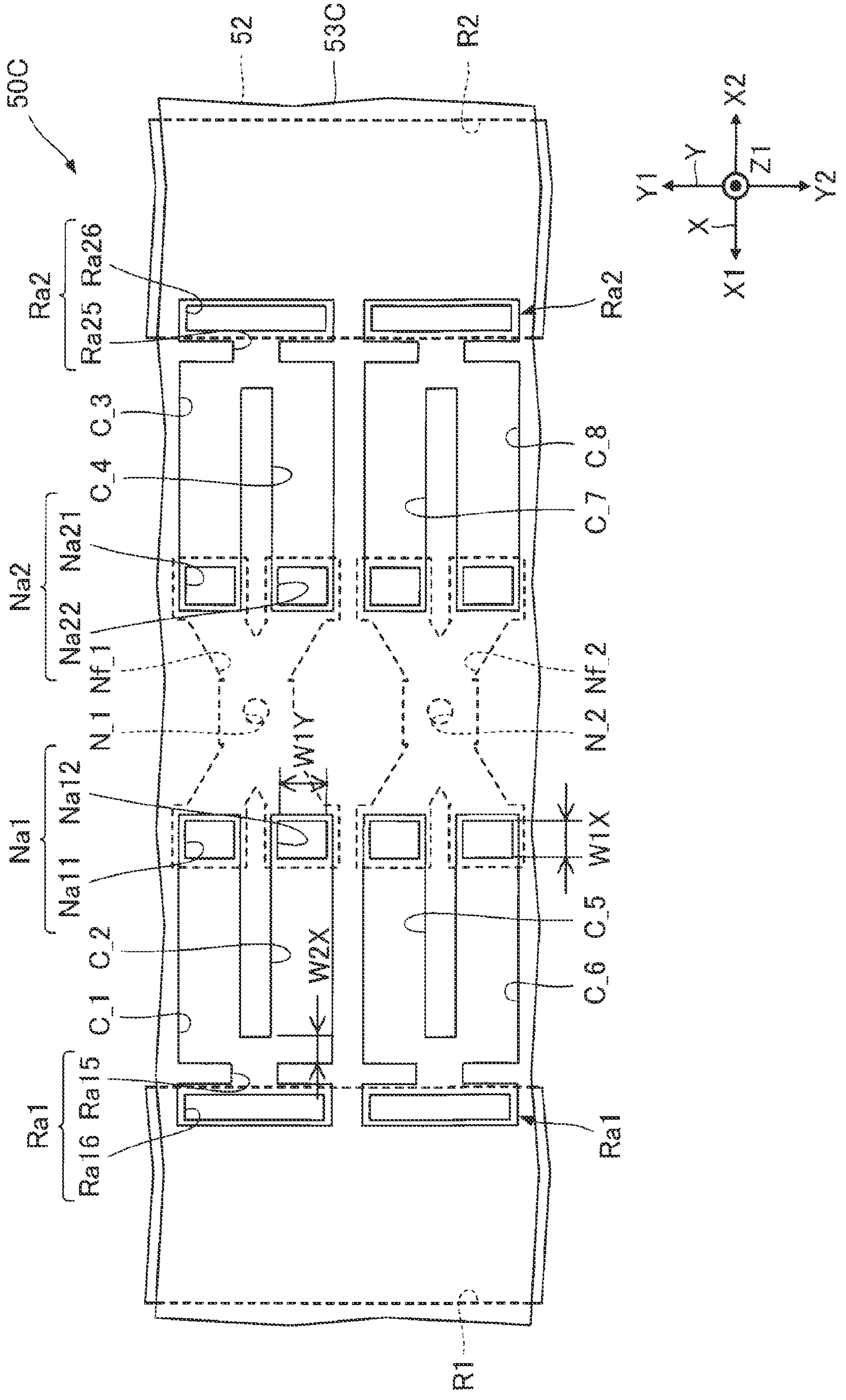
FIG. 10 is a plan view schematically illustrating a channel of the liquid ejecting head illustrated in FIG. 9.

FIG. 9 is a sectional view of a liquid ejecting head 50C according to the fourth embodiment. FIG. 10 is a plan view schematically illustrating a channel of the liquid ejecting head 50C illustrated in FIG. 9. The liquid ejecting head 50C is similar to the liquid ejecting head 50 of the first embodiment described above except that a pressure chamber substrate 53C is provided instead of the pressure chamber substrate 53. The pressure chamber substrate 53C is similar to the pressure chamber substrate 53 except that the pressure chamber substrate 53C has a portion of the communication channel Ra1 and a portion of the communication channel Ra2.

As illustrated in FIG. 9, the communication channel Ra1 of the present embodiment includes a portion Ra15 provided in the pressure chamber substrate 53C and a portion Ra16 provided in the communication plate 52. Similarly, the communication channel Ra2 of the present embodiment includes a portion Ra25 provided in the pressure chamber substrate 53C and a portion Ra26 provided in the communication plate 52.

As illustrated in FIG. 10, in the communication channel Ra1 of the present embodiment, the minimum width of the portion Ra15 in the Y-axis direction is smaller than the minimum width of the portion Ra16 in the Y-axis direction. Thus, the portion Ra15 enables the channel resistance of the communication channel Ra1 to be higher. Here, since the portion Ra15 is provided in the pressure chamber substrate 53C, the portion Ra15 and the pressure chamber C are able to be formed collectively in the same processing step. Thus, it is possible to easily position the portion Ra15 and the pressure chamber C appropriately. Note that, in the present embodiment, the sum A of sectional areas described above is twice a product of W2X indicated in FIG. 10 and W2Z indicated in FIG. 9.

Similarly, in the communication channel Ra2 of the present embodiment, the minimum width of the portion Ra25 in the Y-axis direction is smaller than the minimum width of the portion Ra26 in the Y-axis direction. Thus, the portion Ra25 enables the channel resistance of the communication channel Ra2 to be higher. Here, since the portion Ra25 is provided in the pressure chamber substrate 53C, the portion Ra25 and the pressure chamber C are able to be formed collectively in the same processing step. Thus, it is possible to easily position the portion Ra25 and the pressure chamber C appropriately.

Similarly to the first embodiment described above, the fourth embodiment is also able to achieve improvement of ejection characteristics compared with the related art. In the present embodiment, the communication channel Ra1 and the communication channel Ra2 are provided in the pressure chamber substrate 53C. Thus, it is possible to simplify positioning of the communication channel Ra1, the communication channel Ra2, and the pressure chamber C during manufacturing compared with a configuration in which neither the communication channel Ra1 nor the communication channel Ra2 is provided in the pressure chamber substrate 53C. Note that, although the portion Ra16 is provided in common to the first pressure chamber C_1 and the second pressure chamber C_2 in the example illustrated in FIG. 10, the portion Ra16 is not necessarily provided in common to the first pressure chamber C_1 and the second pressure chamber C_2 and may be provided individually per pressure chamber C.

5. Fifth Embodiment

A fifth embodiment of the disclosure will be described below. In an example of the embodiment below, elements having similar operations and functions to those of the first embodiment will be given the reference numerals used in the description for the first embodiment, and the detailed description thereof will be omitted appropriately.

Figure 11:
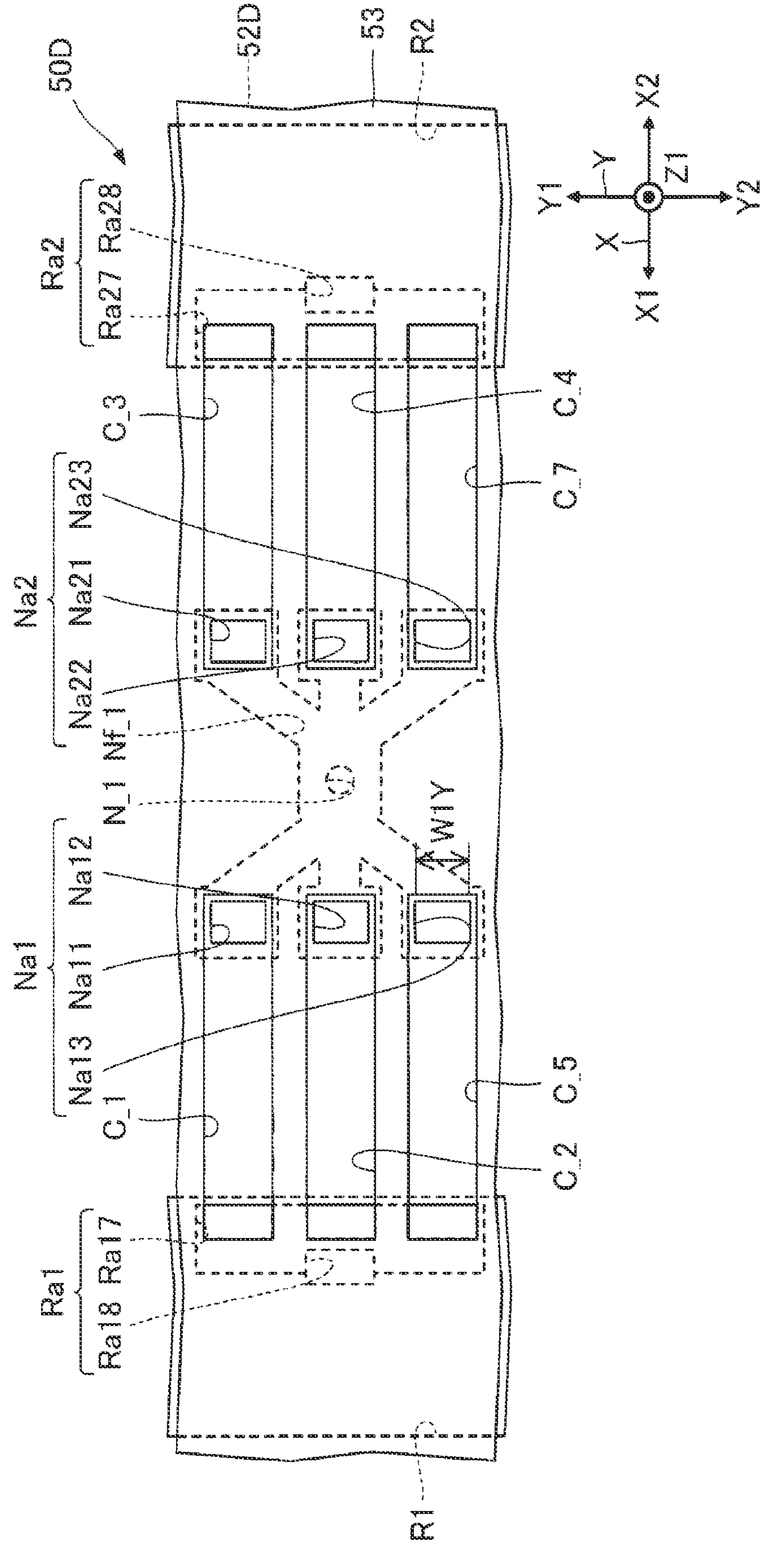
FIG. 11 is a plan view schematically illustrating a channel of a liquid ejecting head according to a fifth embodiment.

FIG. 11 is a plan view schematically illustrating a channel of a liquid ejecting head 50D according to the fifth embodiment. The liquid ejecting head 50D is similar to the liquid ejecting head 50 of the first embodiment described above except that a communication plate 52D is provided instead of the communication plate 52. The communication plate 52D is similar to the communication plate 52 but differs from the communication plate 52 in shapes of the communication channel Ra1 and the nozzle channel Nf.

The communication channel Ra1 of the present embodiment is provided in common to three pressure chambers C. In FIG. 11, the first pressure chamber C_1, the second pressure chamber C_2, and the fifth pressure chamber C_5 are indicated as the three pressure chambers C. Similarly, the communication channel Ra2 of the present embodiment is provided in common to three pressure chambers C. In FIG. 11, the third pressure chamber C_3, the fourth pressure chamber C_4, and the seventh pressure chamber C_7 are indicated as the three pressure chambers C.

The communication channel Ra1 of the present embodiment includes a portion Ra17 communicating with the first pressure chamber C_1, the second pressure chamber C_2, and the fifth pressure chamber C_5 and a portion Ra18 interposed between the portion Ra17 and the first common liquid chamber R1. The portion Ra17 has a shape extending in the Y-axis direction so as to be provided across the first pressure chamber C_1, the second pressure chamber C_2, and the fifth pressure chamber C_5. Here, the length of the portion Ra18 in the Y-axis direction is less than the length of the portion Ra17 in the Y-axis direction. Thus, the portion Ra17 enables the communication channel Ra1 to communicate with the first pressure chamber C_1, the second pressure chamber C_2, and the fifth pressure chamber C_5, and the portion Ra18 enables the channel resistance of the communication channel Ra1 to be higher.

Similarly, the communication channel Ra2 of the present embodiment includes a portion Ra27 communicating with the third pressure chamber C_3, the fourth pressure chamber C_4, and the seventh pressure chamber C_7 and a portion Ra28 interposed between the portion Ra27 and the second common liquid chamber R2. The portion Ra27 has a shape extending in the Y-axis direction so as to be provided across the third pressure chamber C_3, the fourth pressure chamber C_4, and the seventh pressure chamber C_7. Here, the length of the portion Ra28 in the Y-axis direction is less than the length of the portion Ra27 in the Y-axis. Thus, the portion Ra27 enables the communication channel Ra2 to communicate with the third pressure chamber C_3, the fourth pressure chamber C_4, and the seventh pressure chamber C_7, and the portion Ra28 enables the channel resistance of the communication channel Ra2 to be higher.

The first nozzle channel Nf_1, which is the nozzle channel Nf of the present embodiment, communicates with the first pressure chamber C_1, the second pressure chamber C_2, and the fifth pressure chamber C_5 via the communication channel Na1. The communication channel Na1 of the present embodiment includes the first portion Na11, the second portion Na12, and a third portion Na13. Those portions are constituted by holes individually passing through the communication plate 52D. In this manner, the communication channel Na1 is constituted by three channels per nozzle N. Here, the third portion Na13 is interposed between the fifth pressure chamber C_5 and the first nozzle channel Nf_1.

Similarly to the first embodiment described above, the fifth embodiment is also able to achieve improvement of ejection characteristics compared with the related art. In the present embodiment, the fifth pressure chamber C_5 adjacent to the second pressure chamber C_2 in the Y2 direction is further provided in the pressure chamber substrate 53. The first nozzle N_1 communicates with not only the first pressure chamber C_1 and the second pressure chamber C_2 but also the fifth pressure chamber C_5 in common. Thus, it is possible to eject the ink from the first nozzle N_1 efficiently by using not only the pressure in each of the first pressure chamber C_1 and the second pressure chamber C_2 but also the pressure in the fifth pressure chamber C_5.

6. Sixth Embodiment

A sixth embodiment of the disclosure will be described below. In an example of the embodiment below, elements having similar operations and functions to those of the first embodiment will be given the reference numerals used in the description for the first embodiment, and the detailed description thereof will be omitted appropriately.

Figure 12:
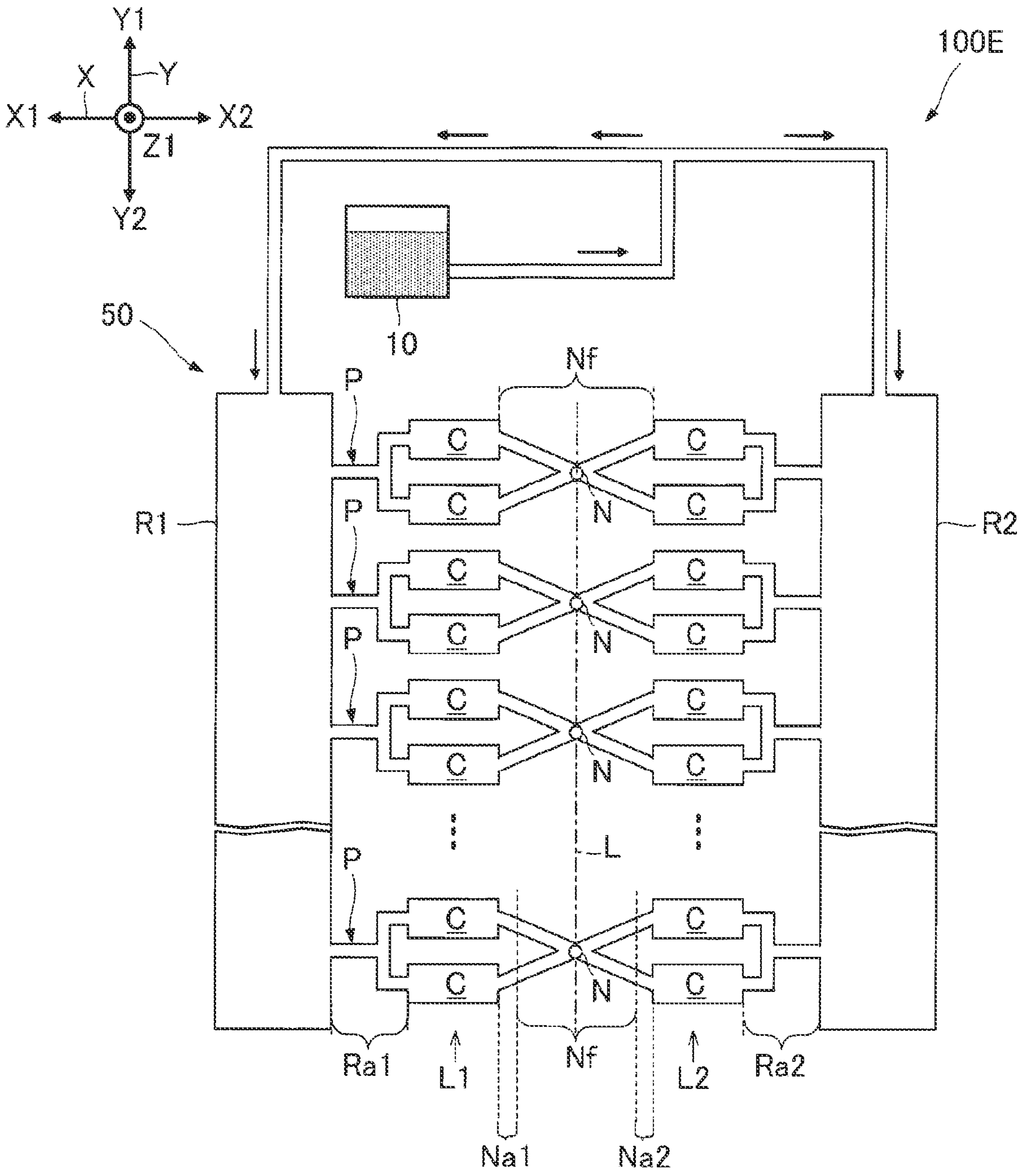
FIG. 12 is an illustration of a liquid channel in a liquid ejecting apparatus according to a sixth embodiment.

FIG. 12 is an illustration of a liquid channel of a liquid ejecting apparatus 100E according to the sixth embodiment. The liquid ejecting apparatus 100E is similar to the liquid ejecting apparatus 100 of the first embodiment described above except that the circulating mechanism 60 is omitted.

In the present embodiment, as illustrated in FIG. 12, the ink in the liquid container 10 is supplied to each of the first common liquid chamber R1 and the second common liquid chamber R2. Note that, although not illustrated, a pump for pressure-feeding the ink to the liquid ejecting head 50 may be provided between the liquid container 10 and the liquid ejecting head 50.

Similarly to the first embodiment described above, the sixth embodiment is also able to achieve improvement of ejection characteristics compared with the related art. Note that, in the present embodiment, the first common liquid chamber R1 is a liquid chamber in which the ink to be supplied to the first pressure chamber C_1 and the second pressure chamber C_2 is stored. The second common liquid chamber R2 is a liquid chamber in which the ink discharged from the third pressure chamber C_3 and the fourth pressure chamber C_4 is stored.

7. Modified Examples

The examples of the above embodiments can be variously modified. Specific modified aspects applicable to the embodiments described above will be exemplified below. Note that any two or more aspects selected from the following exemplification can be appropriately combined within a range in which they do not contradict each other.

7-1. Modified Example 1

The components in each of the individual channels P are formed symmetrically in the Y1 direction or the Y2 direction in each of the embodiments described above, but the disclosure is not limited thereto, and the components in each of the individual channels P may be formed asymmetrically in the Y1 direction or the Y2 direction.

7-2. Modified Example 2

The configuration including the pressure chambers in the row L1 and the pressure chambers C in the row L2 is exemplified in each of the embodiments described above, but the disclosure is not limited thereto, and either the pressure chambers C in the row L1 or the pressure chambers C in the row L2 and components related thereto may be omitted.

7-3. Modified Example 3

The configuration in which the number of pressure chambers C included in each of the individual channels P is four or six is exemplified in each of the embodiments described above, but the disclosure is not limited thereto, and the number may be any number as long as the first pressure chamber C_1 and the second pressure chamber C_2 are included.

7-4. Modified Example 4

The liquid ejecting apparatus 100 of a serial type in which the transporting body 41 on which the liquid ejecting head 50 is mounted is reciprocated is exemplified in each of the embodiments described above, but the disclosure is applicable to a liquid ejecting apparatus of a line type in which a plurality of nozzles N are distributed over the entire width of the medium M.

7-5. Modified Example 5

The liquid ejecting apparatus 100 exemplified in each of the embodiments described above can be adopted for various kinds of equipment, such as a facsimile apparatus and a copying machine, in addition to equipment dedicated to printing. The liquid ejecting apparatus of the disclosure is not limited to being used for printing. For example, a liquid ejecting apparatus that ejects a solution of a color material is used as a manufacturing apparatus that forms a color filter of a liquid crystal display device. Further, a liquid ejecting apparatus that ejects a solution of a conductive material is used as a manufacturing apparatus that forms a wire and an electrode of a wiring substrate.

What is claimed is:

1. A liquid ejecting head comprising:

a pressure chamber substrate in which a first pressure chamber and a second pressure chamber adjacent to the first pressure chamber in a first direction are provided;

a communication plate in which are provided a first communication channel communicating with the first pressure chamber and the second pressure chamber and a first common liquid chamber communicating with the first pressure chamber and the second pressure chamber at positions different from positions at which the first communication channel communicates with the first pressure chamber and the second pressure chamber; and a nozzle substrate in which a first nozzle communicating with the first pressure chamber and the second pressure chamber in common via the first communication channel is provided, wherein a second communication channel communicating with the first common liquid chamber and communicating with the first pressure chamber and the second pressure chamber in common is provided in the pressure chamber substrate or the communication plate, and wherein the first communication channel includes a first portion interposed between the first pressure chamber and the first nozzle, and a second portion interposed between the second pressure chamber and the first nozzle at a position away from the first portion, and wherein A<B+C, wherein A is a sum of sectional areas of openings of the second communication channel opening toward the first pressure chamber and the second pressure chamber, B is a sectional area of an opening of the first portion opening toward the first pressure chamber, and C is a sectional area of an opening of the second portion opening toward the second pressure chamber.

2. The liquid ejecting head according to claim 1, wherein the first pressure chamber and the second pressure chamber extend in a second direction intersecting the first direction, and the first communication channel extends in a third direction intersecting the first direction and the second direction.

3. The liquid ejecting head according to claim 1, wherein a first nozzle channel having a portion interposed between the first nozzle and each of the first portion and the second portion is further provided in the communication plate.

4. The liquid ejecting head according to claim 3, wherein the first nozzle channel extends in a direction intersecting the first direction.

5. The liquid ejecting head according to claim 1, wherein A>B and A>C.

6. The liquid ejecting head according to claim 1, wherein A<B and A<C.

7. The liquid ejecting head according to claim 1, wherein a fifth pressure chamber adjacent to the second pressure chamber in the first direction is further provided in the pressure chamber substrate, and a second nozzle adjacent to the first nozzle in the first direction and communicating with the fifth pressure chamber is further provided in the nozzle substrate.

8. The liquid ejecting head according to claim 7, wherein a sixth pressure chamber adjacent to the fifth pressure chamber in the first direction is further provided in the pressure chamber substrate, and the second nozzle communicates with the fifth pressure chamber and the sixth pressure chamber in common.

9. The liquid ejecting head according to claim 1, wherein the first common liquid chamber is a liquid chamber in which liquid to be supplied to the first pressure chamber and the second pressure chamber is stored.

10. The liquid ejecting head according to claim 1, wherein the first common liquid chamber is a liquid chamber in which liquid discharged from the first pressure chamber and the second pressure chamber is stored.

11. The liquid ejecting head according to claim 1, wherein a third pressure chamber disposed at a position different from a position of the first pressure chamber in a second direction intersecting the first direction is provided in the pressure chamber substrate, a fourth pressure chamber disposed at a position different from a position of the second pressure chamber in the second direction and adjacent to the third pressure chamber in the first direction is provided in the pressure chamber substrate, a second common liquid chamber disposed at a position different from a position of the first common liquid chamber in the second direction and communicating with the third pressure chamber and the fourth pressure chamber is further provided in the communication plate, and the first nozzle communicates with, in addition to the first pressure chamber and the second pressure chamber, the third pressure chamber and the fourth pressure chamber in common.

12. The liquid ejecting head according to claim 11, wherein a third communication channel communicating with the second common liquid chamber and communicating with the third pressure chamber and the fourth pressure chamber in common is further provided in the pressure chamber substrate or the communication plate.

13. The liquid ejecting head according to claim 11, wherein the first common liquid chamber is a liquid chamber in which liquid to be supplied to the first pressure chamber and the second pressure chamber is stored, and the second common liquid chamber is a liquid chamber in which liquid to be supplied to the third pressure chamber and the fourth pressure chamber is stored.

14. The liquid ejecting head according to claim 11, wherein the first common liquid chamber is a liquid chamber in which liquid to be supplied to the first pressure chamber and the second pressure chamber is stored, and the second common liquid chamber is a liquid chamber in which liquid discharged from the third pressure chamber and the fourth pressure chamber is stored.

15. The liquid ejecting head according to claim 1, wherein the second communication channel is not provided in the pressure chamber substrate, and the second communication channel is provided in the communication plate.

16. The liquid ejecting head according to claim 1, wherein the second communication channel is provided in the pressure chamber substrate.

17. A liquid ejecting apparatus comprising:

the liquid ejecting head according to claim 1; and a control section that controls a liquid ejection operation of the liquid ejecting head.

18. A liquid ejecting head comprising:

a pressure chamber substrate in which a first pressure chamber and a second pressure chamber adjacent to the first pressure chamber in a first direction are provided;

a communication plate in which are provided a first communication channel communicating with the first pressure chamber and the second pressure chamber and a first common liquid chamber communicating with the first pressure chamber and the second pressure chamber at positions different from positions at which the first communication channel communicates with the first pressure chamber and the second pressure chamber; and a nozzle substrate in which a first nozzle communicating with the first pressure chamber and the second pressure chamber in common via the first communication channel is provided, wherein a second communication channel communicating with the first common liquid chamber and communicating with the first pressure chamber and the second pressure chamber in common is provided in the pressure chamber substrate or the communication plate, and a third pressure chamber disposed at a position different from a position of the first pressure chamber in a second direction intersecting the first direction is provided in the pressure chamber substrate, a fourth pressure chamber disposed at a position different from a position of the second pressure chamber in the second direction and adjacent to the third pressure chamber in the first direction is provided in the pressure chamber substrate, a second common liquid chamber disposed at a position different from a position of the first common liquid chamber in the second direction and communicating with the third pressure chamber and the fourth pressure chamber is further provided in the communication plate, and the first nozzle communicates with, in addition to the first pressure chamber and the second pressure chamber, the third pressure chamber and the fourth pressure chamber in common.

19. The liquid ejecting head according to claim 18, wherein a third communication channel communicating with the second common liquid chamber and communicating with the third pressure chamber and the fourth pressure chamber in common is further provided in the pressure chamber substrate or the communication plate.

20. The liquid ejecting head according to claim 18, wherein the first common liquid chamber is a liquid chamber in which liquid to be supplied to the first pressure chamber and the second pressure chamber is stored, and the second common liquid chamber is a liquid chamber in which liquid to be supplied to the third pressure chamber and the fourth pressure chamber is stored.

* * * * *